(12) United States Patent
Jung et al.

(10) Patent No.: US 10,241,286 B2
(45) Date of Patent: Mar. 26, 2019

(54) OPTICAL TRANSMITTER AND OPTICAL MODULE INCLUDING THE SAME

(71) Applicant: OE SOLUTIONS CO., LTD., Gwangju (KR)

(72) Inventors: Eun Kyo Jung, Seoul (KR); Hyun Chang Shin, Gwangju (KR); Dai Hyoung Koo, Gwangju (KR)

(73) Assignee: OE SOLUTIONS CO., LTD., Gwangju (KR)

( * ) Notice: Subject to any disclaimer, the term of this patent is extended or adjusted under 35 U.S.C. 154(b) by 0 days.

(21) Appl. No.: 15/198,735

(22) Filed: Jun. 30, 2016

(65) Prior Publication Data

US 2018/0003908 A1  Jan. 4, 2018

(51) Int. Cl.
*G02B 6/42* (2006.01)
*G02B 6/34* (2006.01)
*H04B 10/564* (2013.01)
*H04B 10/50* (2013.01)
*H04J 14/02* (2006.01)
*H04B 10/25* (2013.01)

(52) U.S. Cl.
CPC ............ *G02B 6/4271* (2013.01); *G02B 6/34* (2013.01); *G02B 6/4206* (2013.01); *G02B 6/4244* (2013.01); *G02B 6/4245* (2013.01); *G02B 6/4246* (2013.01); *G02B 6/4286* (2013.01); *H04B 10/25* (2013.01); *H04B 10/503* (2013.01); *H04B 10/564* (2013.01); *H04J 14/0221* (2013.01)

(58) Field of Classification Search
CPC ................................ G02B 6/42; G02B 6/4271

USPC ........................................................ 385/52, 36
See application file for complete search history.

(56) References Cited

U.S. PATENT DOCUMENTS

| 6,939,058 | B2 * | 9/2005 | Gurevich | G02B 6/4206 385/88 |
| 6,985,647 | B2 * | 1/2006 | Takamori | G02B 6/423 385/14 |
| 7,203,391 | B2 * | 4/2007 | Uekawa | G02B 6/4271 385/14 |
| 7,215,885 | B2 * | 5/2007 | Yamane | G02B 6/29362 385/31 |
| 7,281,865 | B2 * | 10/2007 | Baek | G02B 6/4246 385/24 |

(Continued)

*Primary Examiner* — Kaveh C Kianni
(74) *Attorney, Agent, or Firm* — Ichthus International Law PLLC

(57) ABSTRACT

An optical transmitter and an optical module including the optical transmitter are provided. The optical transmitter may include a support substrate, a temperature control module disposed on the support substrate, a sub-mount disposed on the temperature control module, a prism disposed on the temperature control module and having a sloped surface, a light receiving element disposed on the temperature control module, a light emitting element disposed on the sub-mount, and a thermistor disposed on the sub-mount. The light receiving element may be disposed separately from the sub-mount in a first direction, and the prism may be disposed between the light receiving element and the sub-mount. Some first light emitted from the light emitting element may be reflected by the sloped surface of the prism, and some of the first light may pass through the prism and be received by the light receiving element.

14 Claims, 8 Drawing Sheets

(56) References Cited

U.S. PATENT DOCUMENTS

| | | | | |
|---|---|---|---|---|
| 8,036,533 B2* | 10/2011 | Hosomi | ............... | G02B 6/4215 |
| | | | | 398/79 |
| 8,235,605 B2* | 8/2012 | Kim | ................. | G02B 6/4246 |
| | | | | 359/629 |
| 8,488,238 B2* | 7/2013 | Stanley | ................. | G02B 21/16 |
| | | | | 359/368 |
| 8,540,437 B2* | 9/2013 | Lee | ................. | G02B 6/4215 |
| | | | | 385/31 |
| 8,545,112 B2* | 10/2013 | Chien | ................ | G02B 6/4246 |
| | | | | 385/92 |
| 9,535,053 B1* | 1/2017 | Cafferty | ............... | G01N 33/492 |
| 9,638,686 B1* | 5/2017 | Cafferty | ............... | G01N 33/492 |
| 2002/0126717 A1* | 9/2002 | Nasu | .................. | G02B 6/4206 |
| | | | | 372/32 |
| 2003/0039279 A1* | 2/2003 | Nasu | ................... | H01S 5/0687 |
| | | | | 372/36 |
| 2003/0058907 A1* | 3/2003 | Nasu | .................. | H01S 5/02208 |
| | | | | 372/34 |
| 2003/0169788 A1* | 9/2003 | Yokoyama | .......... | H01S 5/02284 |
| | | | | 372/32 |
| 2014/0185051 A1* | 7/2014 | Guan | .................. | G01N 21/553 |
| | | | | 356/445 |
| 2017/0000919 A1* | 1/2017 | Childers | .................. | A61L 2/07 |

* cited by examiner

OPTICAL TRANSMITTER AND OPTICAL MODULE INCLUDING THE SAME

TECHNICAL FIELD

The present disclosure relates to an optical transceiver used for optical communication and an optical module including the same.

DISCUSSION OF RELATED ART

Generally, an optical transceiver refers to a module or device in which various optical communication components are accommodated in a single package that is modularized and connectable to an optical fiber. Recently, a bidirectional optical module, which is made by modularizing an optical transmitter and an optical receiver as a single module, is commonly used, wherein the optical transmitter uses a laser diode which consumes low power and is applicable in long distance transmission, and the optical receiver performs optical communication using a photodiode.

The bidirectional optical transceiver basically includes an optical transmitter, an optical receiver, an optical filter, a receptacle, etc. Further, isolators may be mounted on a two-way optical transceiver to prevent instability of characteristics of a laser diode in the optical transmitter, which is caused by reflected noise.

The optical transmitter may include a thermoelectric cooler (TEC) which adjusts a temperature of the laser diode, a monitoring photodiode (PD) which monitors a light output of the laser diode, and a thermistor which senses the temperature of the laser diode. Such an optical transmitter may be manufactured in a transistor-outline can (TO-Can) type having a TO-56 header.

In general, the monitoring PD does not monitor light output from a front facet of a laser diode coupled to an external channel (an optical fiber) but monitors the light output from a back facet thereof. Accordingly, there are problems in which the light output used in actual communication may not be accurately monitored and, when a circuit is used to stabilize the light output, an accuracy of measurement may be decreased.

Further, the thermistor has to be disposed far away from the laser diode due to a space limitation. Accordingly, for manufacture of a product using dense wavelength division multiplexing (DWDM) technology which requires wavelength stability, it may be difficult to finely control a wavelength of a laser diode. Thus, there is a need for further improved methods and/or apparatus for optical communications.

SUMMARY

The present disclosure is directed to providing an optical transmitter capable of accurately monitoring a light output of a laser diode, and an optical module including the same.

The present disclosure is also directed to providing an optical transmitter capable of accurately sensing a temperature of a laser diode, and an optical module including the same.

The present disclosure is also directed to providing an optical transmitter in which optical components are easily assembled and an optical module including the same.

The present disclosure is also directed to providing an optical module having excellent optical coupling between an optical transmitter and a receptacle.

The scope of the present disclosure is not limited to the above-described objectives, and other unmentioned objectives may be clearly understood by those skilled in the art from the following descriptions.

One aspect of the present disclosure provides an optical transmitter including a support substrate, a temperature control module disposed on the support substrate, a sub-mount disposed on the temperature control module, a prism disposed on the temperature control module and having a sloped surface, a light receiving element disposed on the temperature control module, a light emitting element disposed on the sub-mount, and a thermistor disposed on the sub-mount, wherein the light receiving element is disposed separately from the sub-mount in a first direction, the prism is disposed between the light receiving element and the sub-mount, some of first light emitted from the light emitting element is reflected by the sloped surface of the prism, and some of the first light passes through the prism and is received by the light receiving element.

The temperature control module may include a first pad disposed on the support substrate, a second pad disposed on the first pad, and one or more thermoelectric semiconductors disposed between the first pad and the second pad.

The prism, the light receiving element, and the sub-mount may be disposed on the second pad.

The second pad may include a conductive layer electrically connected to the light receiving element.

The second pad may include an aligning groove formed on the conductive layer, and the prism may be disposed in the aligning groove.

The light emitting element may include a first side which emits the first light toward the prism and a second side which faces the first side, and one surface of the thermistor may be disposed to face the second side of the light emitting element.

An angle formed by the one surface of the thermistor and the second side of the light emitting element may be in the range of 25 to 45 degrees.

The light emitting element may include a first side which emits the first light forward toward the prism, a second side which faces the first side, and a third side and a fourth side which connect the first side and the second side, wherein the thermistor may be disposed adjacent to the third side.

A width of the sub-mount may be greater than a width of the temperature control module, and each of the width of the sub-mount and the width of the temperature control module may be a length in a second direction perpendicular to the first direction.

The optical transmitter may further include a plurality of first lead electrodes disposed along one side of the temperature control module, and a plurality of second lead electrodes disposed along the other side of the temperature control module, wherein the one side and the other side of the temperature control module may be sides parallel to the first direction.

The optical transmitter may further include a housing coupled to the support substrate, and a lens disposed on the housing to collect the first light reflected by the sloped surface.

Another aspect of the present disclosure provides an optical module including a case, and an optical transmitter, an optical receiver, and a receptacle which are inserted into the case, wherein the optical transmitter includes a support substrate, a temperature control module disposed on the support substrate, a sub-mount disposed on the temperature control module, a prism disposed on the temperature control module and having a sloped surface, a light receiving element disposed on the temperature control module, a light emitting element disposed on the sub-mount, and a thermistor disposed on the sub-mount, wherein the light receiving element is disposed separately from the sub-mount in a first direction, the prism is disposed between the light receiving element and the sub-mount, some of first light emitted from the light emitting element is reflected by the sloped surface of the prism, and some of the first light passes through the prism and is received by the light receiving element.

The receptacle may include an optical fiber to which the first light is coupled, and a cross section of the optical fiber may be sloped.

BRIEF DESCRIPTION OF THE DRAWINGS

The above and other objects, features and advantages of the present disclosure will become more apparent to those of ordinary skill in the art and appended claims. A more detailed understanding may be obtained from the following description in conjunction with the following accompanying drawings.

DETAILED DESCRIPTION OF EXEMPLARY EMBODIMENT(S)

Figure 1:
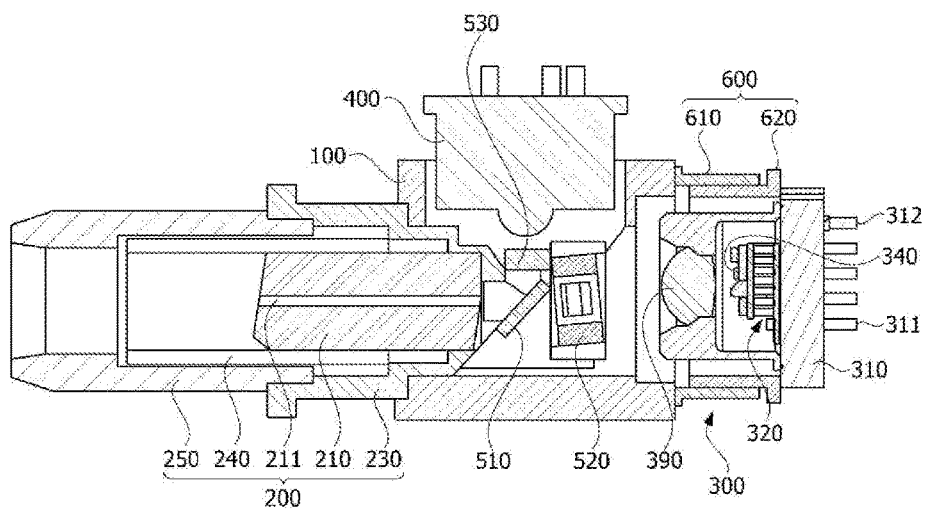
FIG. 1 is a view illustrating an example of an optical module according to an aspect of the present disclosure.

While the present disclosure is susceptible to various modifications and alternative forms, specific embodiments thereof are shown by way of example in the drawings and will be described herein in detail.

However, it should be understood that there is no intent to limit the present disclosure to the particular forms disclosed, and on the contrary, the present disclosure is to cover all modifications, equivalents, and alternatives falling within the spirit and scope of the present disclosure.

It should be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

In addition, it should be understood that enlarged or shrunk drawings attached in the present disclosure are illustrated for convenience of the explanation.

With reference to the appended drawings, exemplary embodiments of the present disclosure will be described in detail below. To aid in understanding the present disclosure, like numbers refer to like elements throughout the description of the figures, and the description of the same elements will not be repeated.

FIG. 1 is a view illustrating an optical module according to an exemplary embodiment of the present disclosure.

Referring to FIG. 1, an optical module according to the exemplary embodiment of the present disclosure includes a case 100, a receptacle 200 inserted into the case 100, an optical transmitter 300, and an optical receiver 400.

The case 100 may include the receptacle 200, the optical transmitter 300, and a plurality of openings into which the optical receiver 400 is inserted. In particular, the receptacle 200 and the optical transmitter 300 are disposed in the case 100 to face each other, and the optical receiver 400 may be disposed in a direction perpendicular to a direction in which the optical transmitter 300 is inserted. However, the present disclosure is not limited thereto, and the receptacle 200, the optical transmitter 300, and the optical receiver 400 may be disposed in various ways.

The receptacle 200 may be connected to an external connector and outputs a second light signal output from the outside toward a first optical filter 510. The receptacle 200 may include a first holder 230 coupled to the case 100, a stub 210 which is inserted into the first holder 230 and in which an optical fiber 211 is disposed, a sleeve 240 coupled to the stub 210, and a second holder 250 which is coupled to the first holder 230 and to which the external connector may be connected.

The optical transmitter 300 transmits a first light signal to the outside through the optical fiber 211 of the receptacle 200. The first light signal has a wavelength different from a wavelength of the second light signal output from the optical fiber 211. All types of general transistor-outline can (TO-Can) structures including a light source 340, a support substrate 310, and a lens 390 may be applied to the optical transmitter 300.

The light source 340 includes a semiconductor light emitting element, converts an electrical signal to a light signal, and outputs the light signal. The light source 340 may include a laser diode. The laser diode consumes low power, has a small spectrum width, and thus has an advantage of finely collecting light having high output power. In an aspect of the present disclosure, in the following description, the laser diode is provided as the light source.

A support substrate 310 on which the laser diode 340 is mounted is formed in a disk shape, and a plurality of lead electrodes 311 and 312 pass through and are inserted into the support substrate 310. The lead electrodes 311 and 312 form an electrical path between the light source and an external circuit substrate (not shown). As an example, a positive polarity (+) signal, a negative polarity (−) signal, and a ground signal may be output from each of the lead electrodes.

A lens 390 collects the first light signal and transmits the first light signal to the receptacle 200. The lens 390 may be disposed at a proper location to be optically coupled to the optical fiber 211 of the receptacle 200.

A distance control member 600 may include a first control member 610 disposed at one side of the case 100, and a second control member 620 fixedly inserted into the first control member 610. A distance of the first light signal from the optical transmitter 300 to the optical fiber 211 may be adjusted according to the extent to which the second control member 620 is inserted into the first control member 610. Accordingly, an output of the optical transmitter 300 may be adjusted according to the extent to which the second control member 620 is inserted into the first control member 610.

The optical transmitter 300 is fixedly inserted into one side of the second control member 620.

The insides of the first control member 610 and the second control member 620 are made in a hollow cylindrical shape, and diameters thereof are different from each other. The second control member 620 is inserted at a proper location inside the first control member 610, and then fixed by welding, etc. Here, the proper location refers to a location where an output level of the first light signal is adjusted to meet requirements.

The optical receiver 400 converts the second light signal, which is received from the outside through the optical fiber 211, to an electrical signal. The optical receiver 400 includes a photodiode. When a light signal is transmitted to the photodiode, a reverse current proportional to an amount of the transmitted light flows. That is, the optical receiver 400 changes an output current according to an amount of the transmitted light and converts the light signal to the electrical signal.

As the first optical filter 510 is an optical filter, the first optical filter 510 may be disposed between the optical transmitter 300 and the receptacle 200 and pass a light signal, which is transmitted from the optical transmitter 300, to transmit the light signal to the optical fiber 211 of the receptacle 200.

The first optical filter 510 may be designed only to pass a light signal of a specific wavelength. For example, a first filter may only pass a first light signal output from the optical transmitter 300 and reflect the second light signal output through the optical fiber 211 of the receptacle 200 from the outside. In one implementation, the first optical filter 510 may include a 45 degrees filter to reflect the second light signal in a direction perpendicular to an incident direction, but an arrangement and a reflecting angle of the first optical filter 510 may not be limited thereto. The first optical filter may be a splitter.

A second optical filter 530 passes the second light signal reflected by the first optical filter 510. The second light signal passing through the second optical filter 530 is transmitted to the optical receiver 400 to be converted to an electrical signal by the optical receiver 400.

The second optical filter 530 may be disposed to face the first optical filter 510 to pass a light signal vertically reflected by the first optical filter 510, and may include a zero-degree filter.

An isolator 520 may block a light signal which is received by being reflected by an optical component included in the optical fiber 211 or an optical module. The isolator 520 may include a polarizer and an analyzer which only pass a light signal of a preset polarized component and a Faraday rotor which rotates a light signal received therein to be linearly polarized at 45 degrees.

Figure 2:
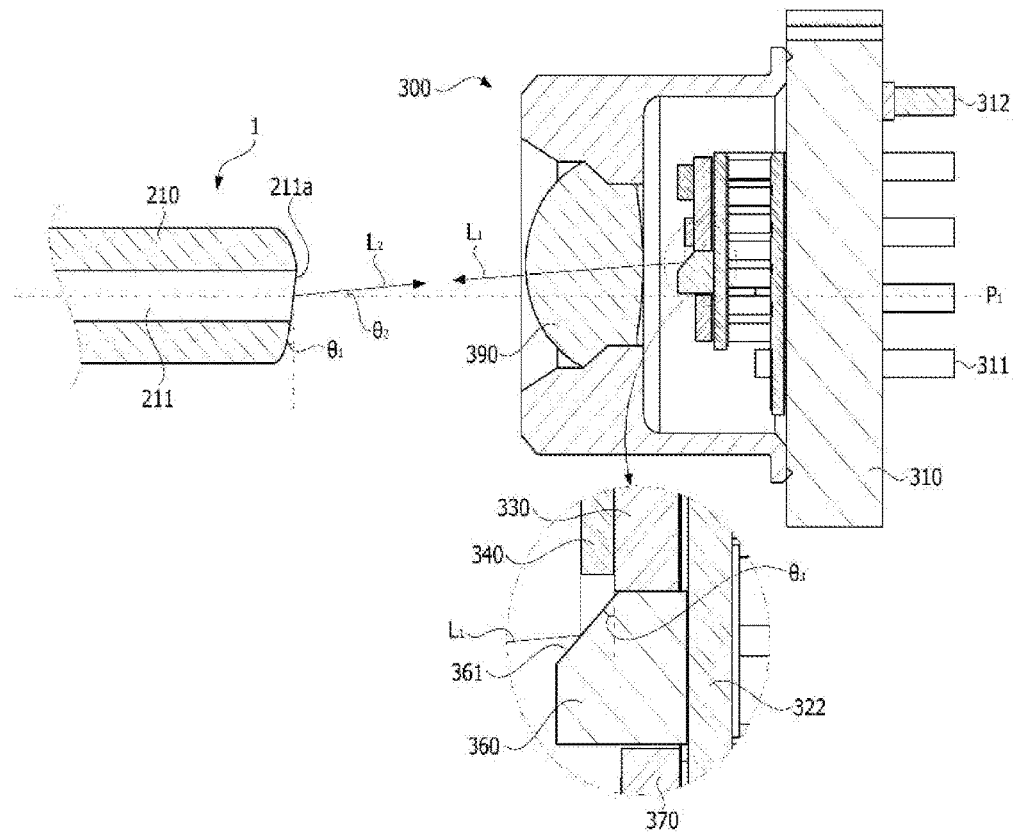
FIG. 2 is a view for describing a coupling state of a second light output from an optical fiber of a receptacle and a first light output from an optical transmitter.

FIG. 2 is a view conceptually illustrating a coupling state of a second light output from an optical fiber of a receptacle and a first light output from an optical transmitter.

Referring to FIG. 2, an end 211a of the optical fiber 211 may be polished to have an angle $\theta_1$ of about 8 degrees based on a vertical line. Accordingly, a second light signal $L_2$ emitted from the optical fiber 211 is emitted while an angle $\theta_2$ of a light path thereof is inclined at about 4 degrees based on a horizontal line P1. However, the sloped angle and emitted angle of the end of the optical fiber 211 may be variously modified according to a type of the optical module.

When the light path of the second light signal $L_2$ output from the optical fiber 211 and a light path of a first light signal $L_1$ output from the optical transmitter 300 match a path of light incident on the optical fiber 211, reflection at a cross section of the optical fiber may be reduced. Accordingly, light coupling efficiency can be improved. Here, the light path may be a path of main light.

That is, when a first virtual line extending from the second light signal $L_2$ has an angle of about 4 degrees with respect to a central axis P1, a second virtual line extending from the first light signal $L_1$ also has an angle of 4 degrees with respect to the central axis P1. Here, an emitted light path may be a path of the second light signal $L_2$ emitted from the optical fiber 211, and an incident light path may be a final light path through which the first light signal $L_1$ is transmitted to the optical fiber 211.

When an emitted light path of the second light signal $L_2$ matches an incident light path of the first light signal $L_1$, light coupling efficiency may be improved. Further, light emitted from the optical transmitter 300 may reduce noise reflected from the optical fiber 211, thereby improving reliability thereof.

In the example embodiment, the incident light path of the first light signal $L_1$ may be adjusted by adjusting an angle $\theta_3$ of a sloped surface 361 of a prism 360 which reflects the first light signal $L_1$ emitted from the laser diode 340. Here, the angle $\theta_3$ of the sloped surface may satisfy the following Relational expression 1.

$$\theta_3 = 45° \pm \theta_1/2, \qquad \text{[Relational Expression 1]}$$

where $\theta_1$ is a polishing angle of the optical fiber 211 of the receptacle 200.

For example, when an end of the optical fiber 211 is polished to have an angle of about 8 degrees with respect to the vertical line, the angle $\theta_2$ of the emitted light path of the second light signal $L_2$ is about 4 degrees with respect to a horizontal line P1. Here, when an angle of the sloped surface 361 of the prism 360 is about 41 degrees or 49 degrees, a light coupling efficiency may be improved. As shown in FIG. 2, the angle $\theta_3$ of the sloped surface may be about 41 degrees. However, when the angle of the sloped surface of the optical transmitter is 180 degrees rotationally symmetrical to the horizontal line P1, the angle $\theta_3$ of the sloped surface may be about 49 degrees.

Figure 3:
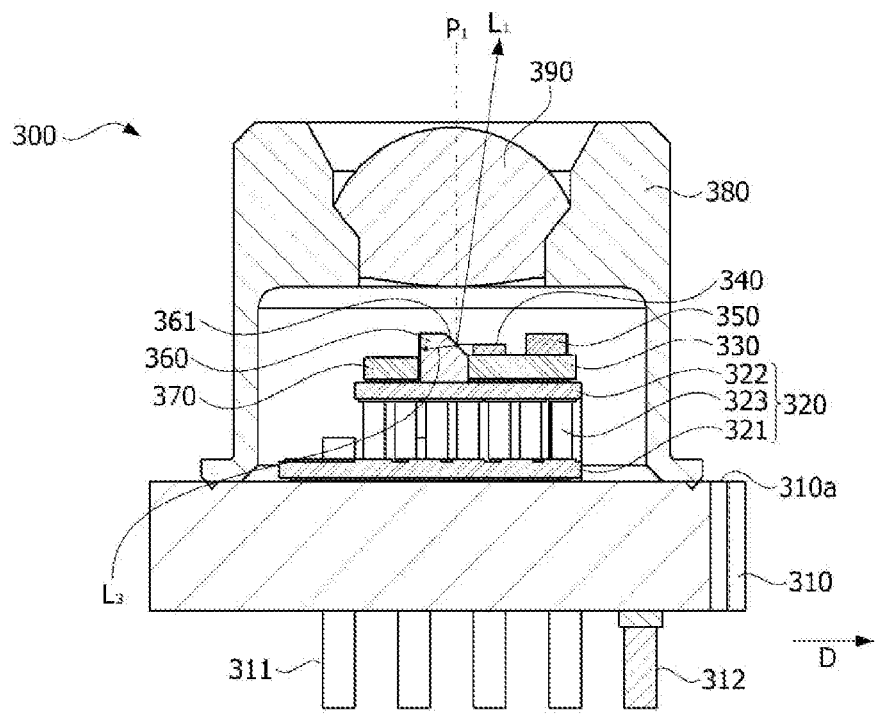
FIG. 3 is a view illustrating an example of an optical transmitter according to an aspect of the present disclosure.
Figure 4:
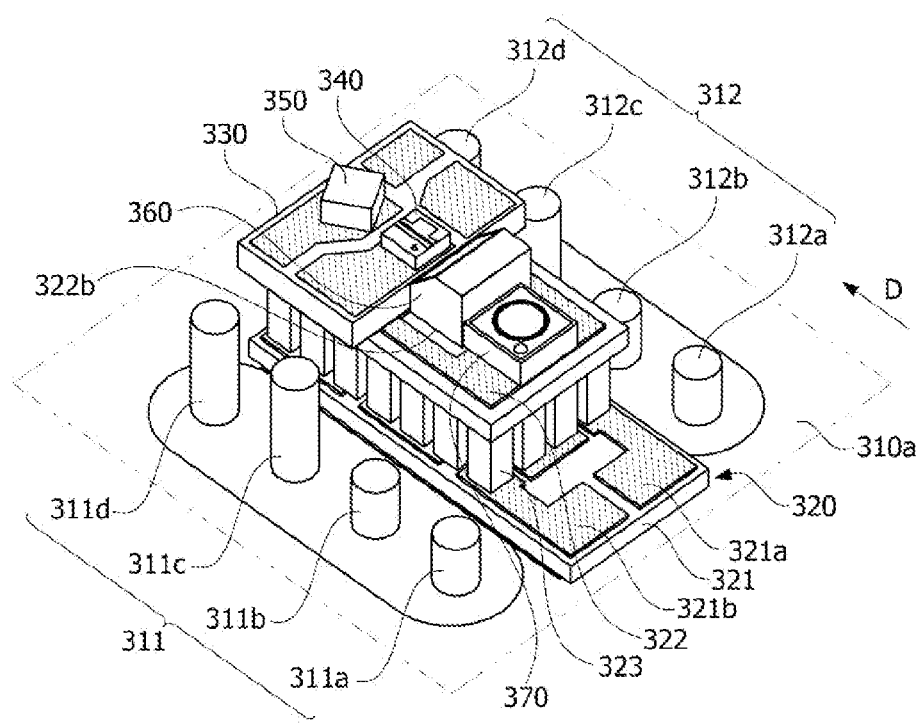
FIG. 4 is a view illustrating a detailed configuration of the example of the optical transmitter.

FIG. 3 is a view illustrating an optical transmitter according to an aspect of the present disclosure, and FIG. 4 is a view illustrating a detailed configuration of the optical transmitter in another aspect of the present disclosure.

Referring to FIG. 3, the optical transmitter 300 includes a support substrate 310, a temperature control module 320 disposed on the support substrate 310, a sub-mount 330 disposed on the temperature control module 320, a prism 360 disposed on the temperature control module 320 and having a sloped surface 361, a light receiving element 370 disposed on the temperature control module 320, a laser diode 340 disposed on the sub-mount 330, and a thermistor 350 disposed on the sub-mount 330.

The support substrate 310 is in a disk shape and has one surface 310a and another surface. A plurality of lead electrodes 311 and 312 may be inserted into the support substrate 310. The support substrate 310 may be a TO-56 header, but is not limited thereto.

The light receiving element 370 is disposed separately from the sub-mount 330 in a first direction D, and the prism 360 may be disposed between the light receiving element 370 and the sub-mount 330. The first direction may be parallel to the support substrate 310 and may be a direction perpendicular to the horizontal line P1.

Some of the first light $L_1$ emitted from the laser diode 340 is reflected by the sloped surface 361 of the prism 360, and remaining first light $L_2$ may pass through the prism 360. The sloped surface 361 of the prism 360 has an angle of 41 degrees to 49 degrees with respect to the first light and reflectivity thereof may be in the range of 92% to 98%. Accordingly, 92% to 98% of the first light may be reflected and emitted to the outside through the lens 390. As described above, the light coupling efficiency between the emitted light and the optical fiber 211 of the receptacle 200 may be improved by adjusting the angle of the sloped surface 361.

Remaining light $L_3$, i.e., 2% to 8% of light, may pass through the prism 360 and is transmitted to an active region of the light receiving element 370. The light receiving element 370 may monitor an output of the first light emitted from the laser diode 340. In the example, since the light receiving element 370 is configured to directly monitor a light output from the optical fiber 211 (not shown in FIG. 3), the light output may be controlled in a stable manner.

A housing 380 is disposed on the support substrate 310 to protect optical components. The lens 390 disposed at the center of the housing 380 may collect the first light reflected by and emitted from the sloped surface or may convert the first light to parallel light.

Referring to FIG. 4, the temperature control module 320 may include a first pad 321 disposed on the support substrate 310, a second pad 322 disposed on the first pad 321, and one or more thermoelectric semiconductors 323 disposed between the first pad 321 and the second pad 322. In the example, the temperature control module 320 may be a thermoelectric element, but all types of various components may be used, as long as a temperature inside the optical transmitter 300 is adjustable.

Further, conductive patterns 321a and 321b may be formed on an insulating layer (not shown) of the first pad 321. The insulating layer may be any one of $Al_2O_3$ and AlN, and the conductive patterns 321a and 321b may be Au plated on the insulating layer, however, other materials of the insulating layer and the conductive patterns may be used.

A conductive pattern may be formed on an insulating layer of the second pad 322. Materials of the insulating layer and the conductive pattern may be the same as that of the first pad 321. The second pad 322 may be a cooling pad.

A plurality of first lead electrodes 311 may be disposed along one side of the temperature control module 320, and a plurality of second lead electrodes 312 may be disposed along another side of the temperature control module 320. In the example shown, the plurality of first lead electrodes 311 and the plurality of second lead electrodes 312 may be disposed to protrude in the first direction D. For example, a first-first lead electrode 311a electrically connected to the temperature control module 320 may be disposed at a lower level than a first-third lead electrode 311c electrically connected to the laser diode 340.

The prism 360 may be disposed in an aligning groove 322b formed in the second pad 322 and may be disposed to come into contact with the sub-mount 330. The laser diode 340 and the thermistor 350 may be disposed on the sub-mount 330.

Figure 5:
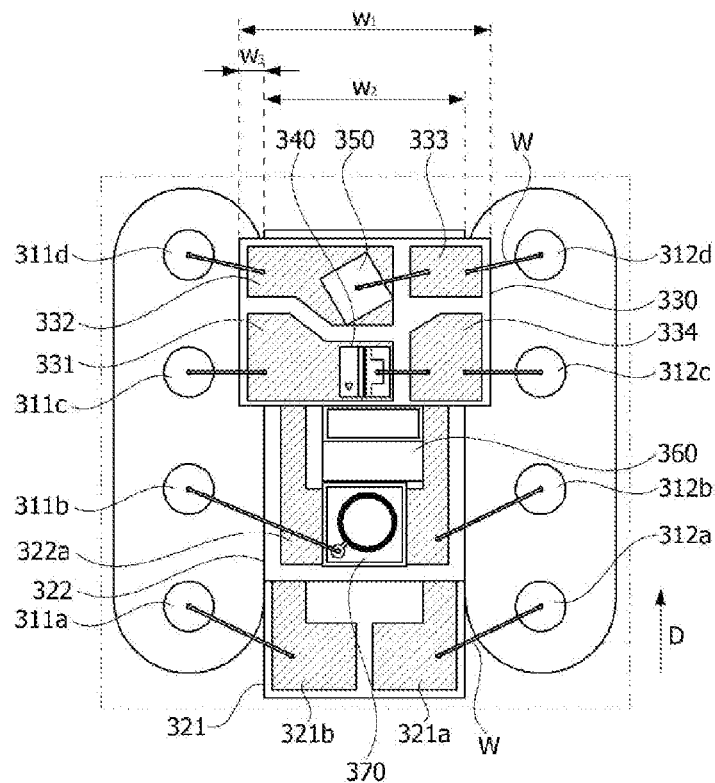
FIG. 5 is a view illustrating a state in which each component is electrically connected to a lead electrode.
Figure 6:
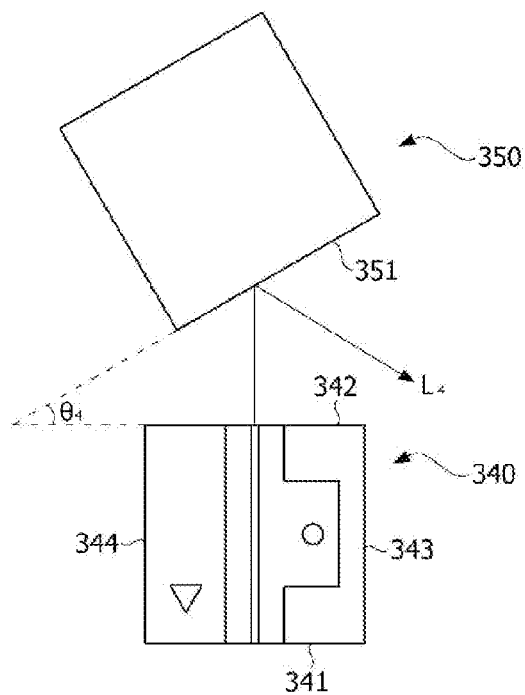
FIG. 6 is a view illustrating an example arrangement relationship between a laser diode and a thermistor.
Figure 7:
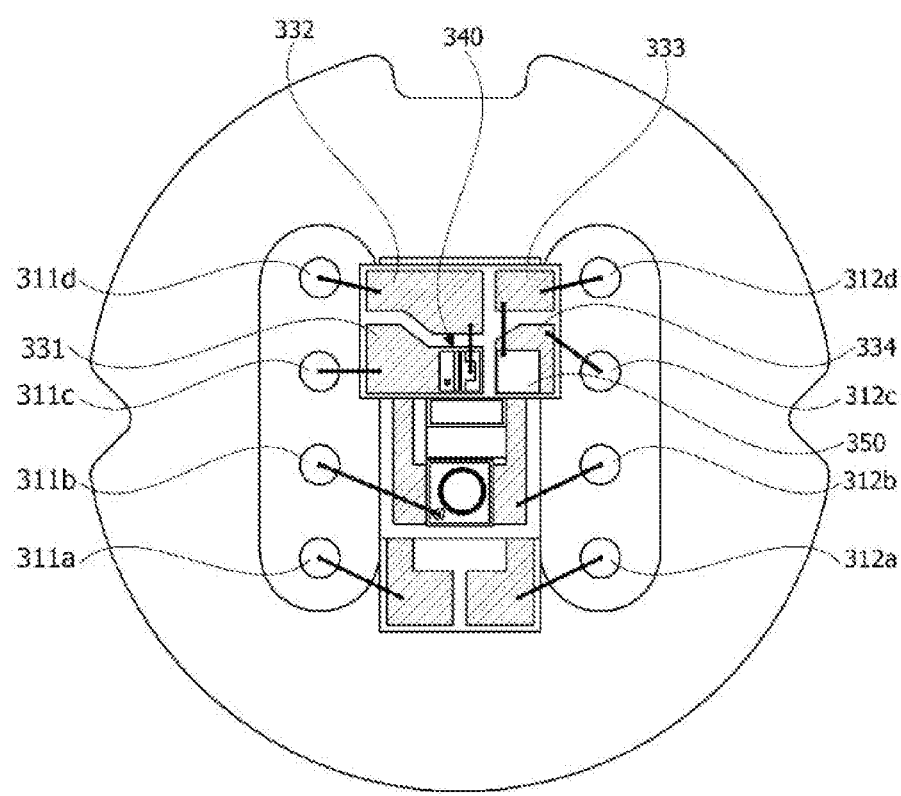
FIG. 7 is a modified example of FIG. 5.

FIG. 5 is a view illustrating electrical connections of components to a lead electrode, FIG. 6 is a view illustrating an arrangement relationship between a laser diode and a thermistor, and FIG. 7 is a modified example of FIG. 5.

Referring to FIG. 5, a first electrode pattern 321b disposed on the first pad 321 may be electrically connected (or coupled) to the first-first lead electrode 311a, and a second electrode pattern 321a may be electrically connected (or coupled) to a second-first lead electrode 312a. The first electrode pattern 321b and the second electrode pattern 321a may apply a power source to the thermoelectric semiconductor 323 shown in FIG. 4.

An electrode formed on an upper surface of the light receiving element 370 may be electrically connected (or coupled) to a first-second lead electrode 311b, and an electrode pattern 322a disposed on an upper surface of the second pad 322 may be electrically connected (or coupled) to a second-second lead electrode 312b.

An electrode pattern 331 on which the laser diode 340 is disposed may be electrically connected to the first-third lead electrode 311c, and an electrode pattern 334 disposed adjacent and electrically connected to the laser diode 340 may be electrically connected to a second-third lead electrode 312c. According to the above configuration, heat of the second-third lead electrode 312c is not directly transmitted to the laser diode 340, thereby securing thermal reliability thereof. Further, a length of a wire W may be formed to be short between the second electrode pattern 321a and the second-first lead electrode 312a.

An electrode pattern 332 on which the thermistor 350 is disposed may be electrically connected (or coupled) to a first-fourth lead electrode 311d, and an electrode pattern 333 disposed adjacent to the thermistor 350 may be electrically connected (or coupled) to a second-fourth lead electrode 312d. According to the configuration shown in the example, heat of the second-fourth lead electrode 312d is not directly transmitted to the thermistor 350, thereby securing thermal reliability thereof.

In the example, a width w1 of the sub-mount 330 may be greater than a width w2 of the temperature control module 320. The width w1 of the sub-mount 330 and the width w2 of the temperature control module 320 may be lengths in a second direction perpendicular to the first direction D. Further, since the length of the wire may be shortened as much as the width w1 of the sub-mount 330 is increased, a component L (inductance) of the wire W may be reduced.

A difference (i.e., w3) between the width w1 of the sub-mount 330 and the width w2 of the temperature control module 320 may be in a range of about 20 mm to 40 mm. For example, the width w2 of the temperature control module 320 may be 1.20 mm, and the width w1 of the sub-mount 330 may be 1.50 mm, but the present disclosure is not limited thereto.

Referring to FIG. 6, the laser diode 340 may include a first side 341 which emits first light toward the prism 360 and a second side 342 facing the first side 341. A surface 351 of the thermistor 350 may be disposed to face the second side 342 of the laser diode 340 as shown in FIG. 6. In the example, the thermistor 350 may be disposed close to the laser diode 340 and may accurately measure a change in a temperature of the laser diode 340. Accordingly, a change in a light wavelength caused by the temperature change may be effectively measured and/or suppressed.

Here, in the example, an angle $\theta_4$ may be formed by the one surface 351 of the thermistor 350 with respect to the second side 342 of the laser diode 340 and the angle $\theta_4$ may be in a range of 25 degrees to 45 degrees. By way of example, when the angle $\theta_4$ is less than 25 degrees, light output to the second side 342 may be reflected by the one surface 351 of the thermistor 350 and be returned again to the laser diode 340. In such a case, an output of the laser diode 340 may become unstable. On the other hand, by way of example, when the angle $\theta_4$ is more than 45 degrees, an effective area facing the laser diode 340 may shrink, and thus, measurements of an accurate temperature of the laser diode 340 may be difficult.

Referring to FIG. 7, the thermistor 350 may be disposed adjacent to a side which is not a light emitting surface of a laser diode 340. In this example, the light output in a rearward direction of the laser diode 340 may not be reflected. In this case, the electrode pattern 331 on which the laser diode 340 is disposed may be electrically connected (or coupled) to the first-third lead electrode 311c, and the electrode pattern 332 connected to the laser diode 340 using a wire may be electrically connected (or coupled) to the first-fourth lead electrode 311d.

The electrode pattern 334 on which the thermistor 350 is disposed may be electrically connected (or coupled) to the second-third lead electrode 312c, and the electrode pattern 334 connected (or coupled) to the laser diode 340 using a wire may be electrically connected (or coupled) to the second-fourth lead electrode 312d. That is, according to the example, the laser diode 340 and the thermistor 350 may be electrically connected (or coupled) to lead electrodes disposed on a side on which the laser diode 340 and the thermistor 350 are disposed.

FIGS. 8A to 8G provide views for conceptually illustrating a process of manufacturing the optical transmitter according to an aspect of the present disclosure.

Figure 8A:
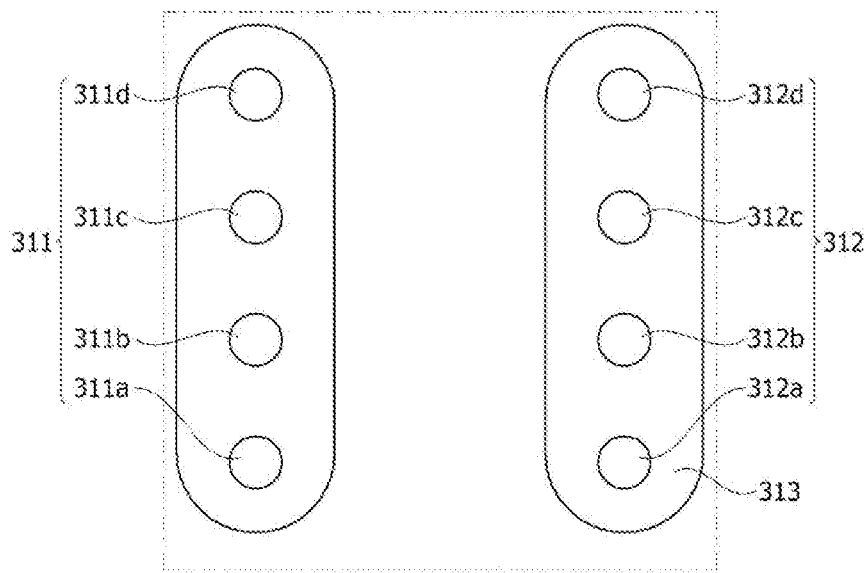
FIGS. 8A to 8G are views for describing an example of a process for manufacturing the optical transmitter according to an aspect of the present disclosure.

Referring to FIG. 8A, the plurality of first lead electrodes 311 may be disposed on one side, and the plurality of second lead electrodes 312 may be disposed separately from the first lead electrodes 311. The plurality of first lead electrodes 311 and the plurality of second lead electrodes 312 may pass through and be inserted into an insulating member 313 and may be electrically insulated from each other.

Figure 8B:
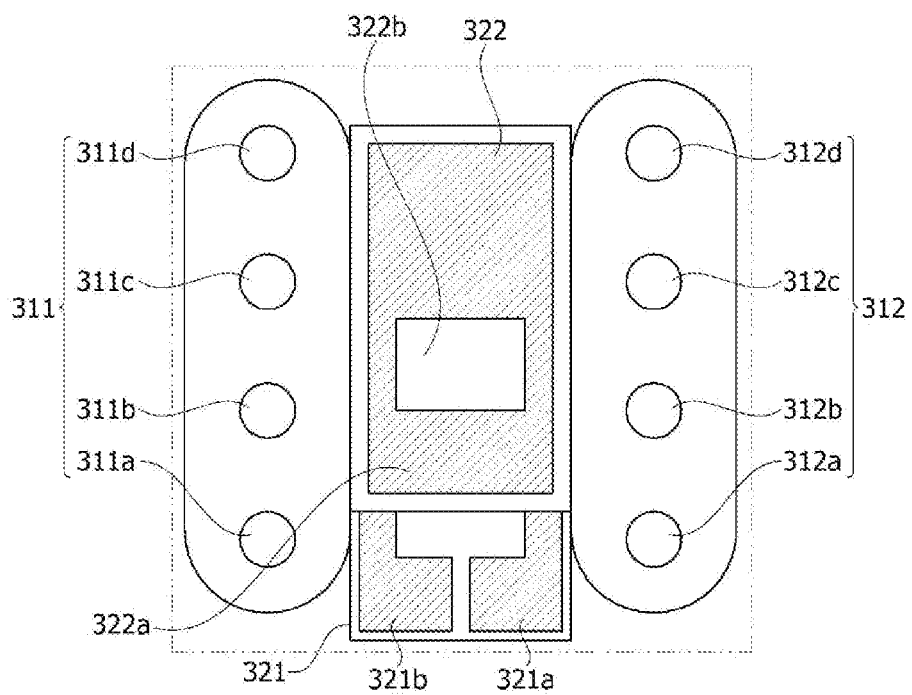
Figure 8C:
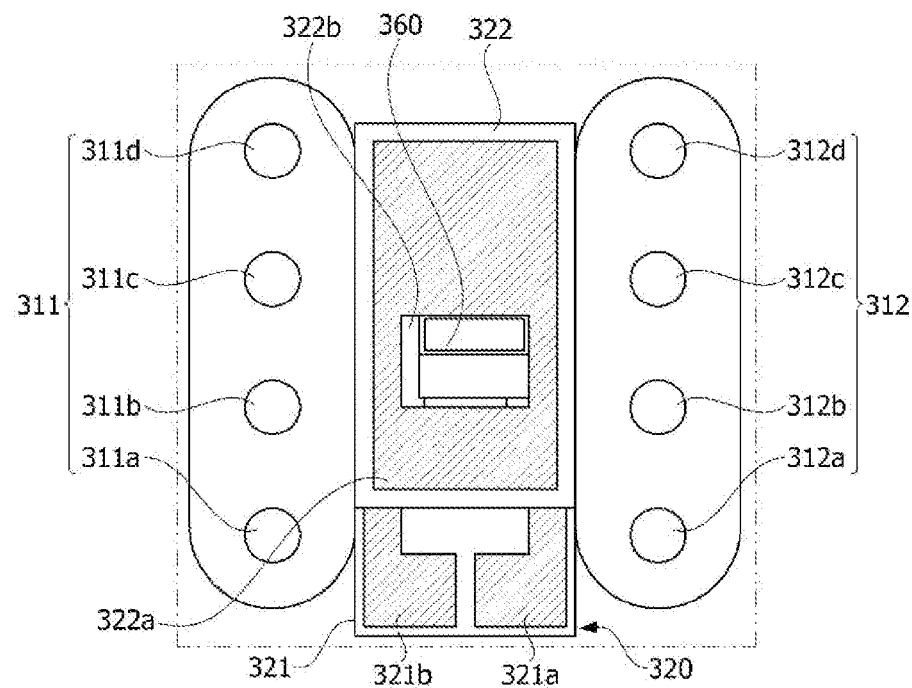

Referring to FIG. 8B, the temperature control module 320 may be die-bonded between the plurality of first lead electrodes 311 and the plurality of second lead electrodes 312. The aligning groove 322b may be formed in the electrode pattern 322a of the second pad 322. Referring to FIG. 8C, the prism 360 may be die-bonded in the aligning groove 322b.

Figure 8D:
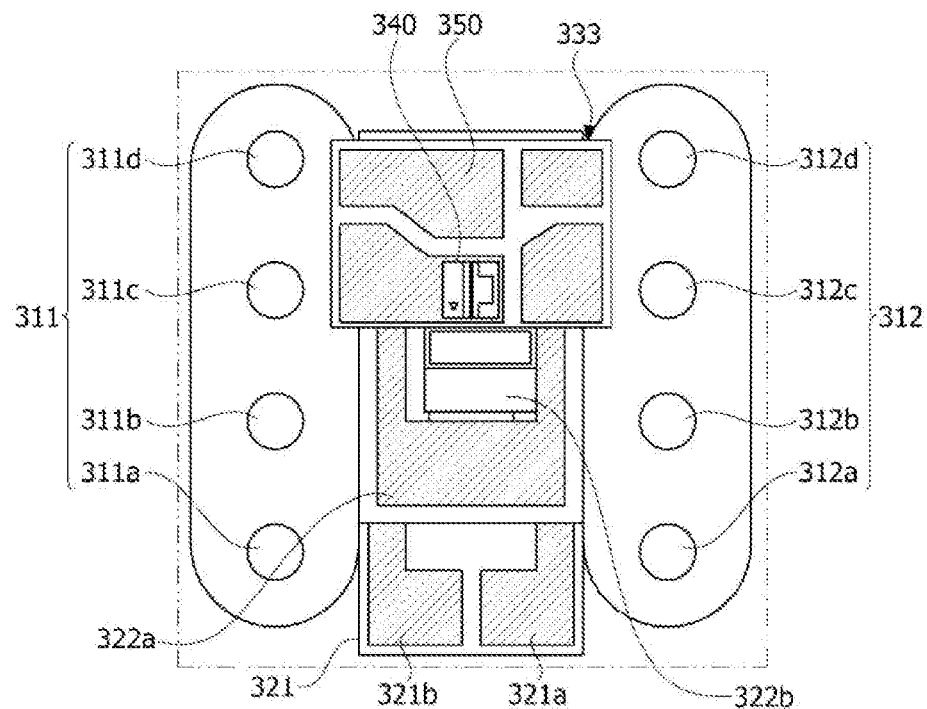
Figure 8E:
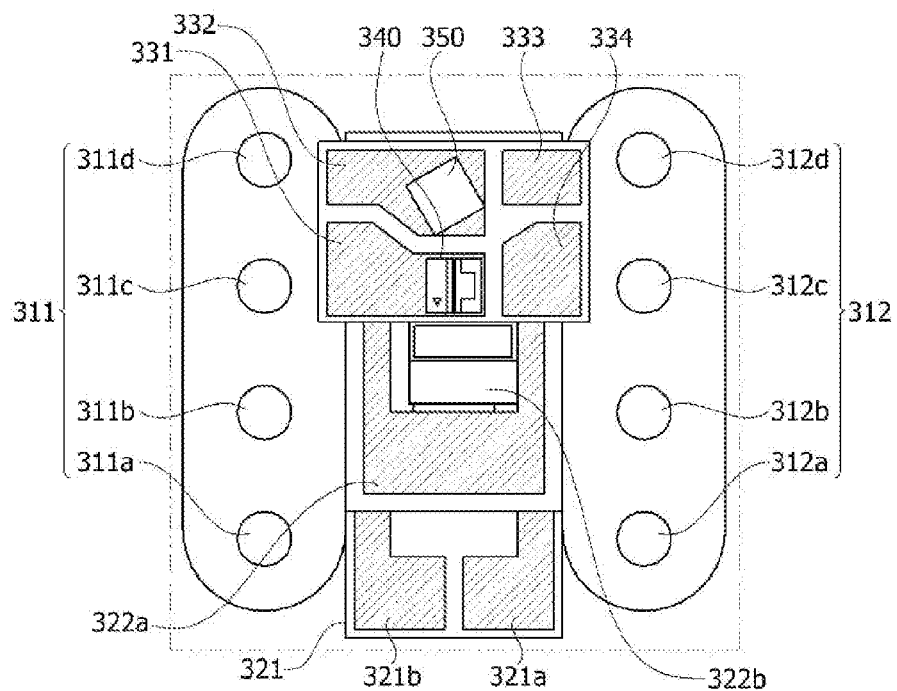
Figure 8F:
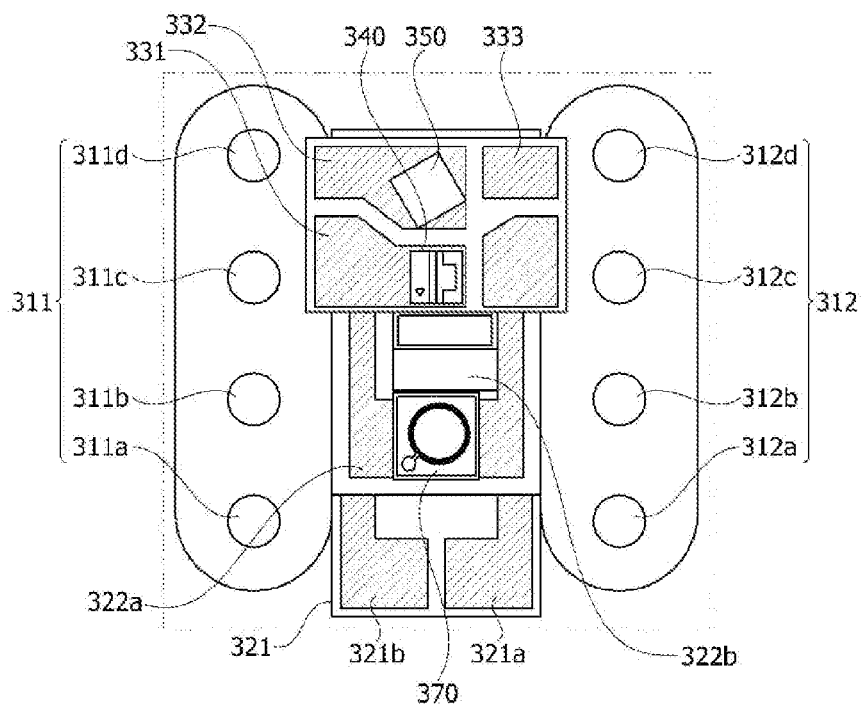

Referring to FIG. 8D, the sub-mount 330 may be die-bonded in the aligning groove 322b of the second pad 322. Here, one surface of the sub-mount 330 may be in contact with the prism 360. That is, after the prism 360 is disposed or fixed in the aligning groove 322b, and when the sub-mount 330 is disposed or fixed to come into contact with the prism 360, light paths of the laser diode 340 and the prism 360 may be arranged. Then, the thermistor 350 and the light receiving element 370 may be die-bonded as shown in FIGS. 8E and 8F.

Figure 8G:
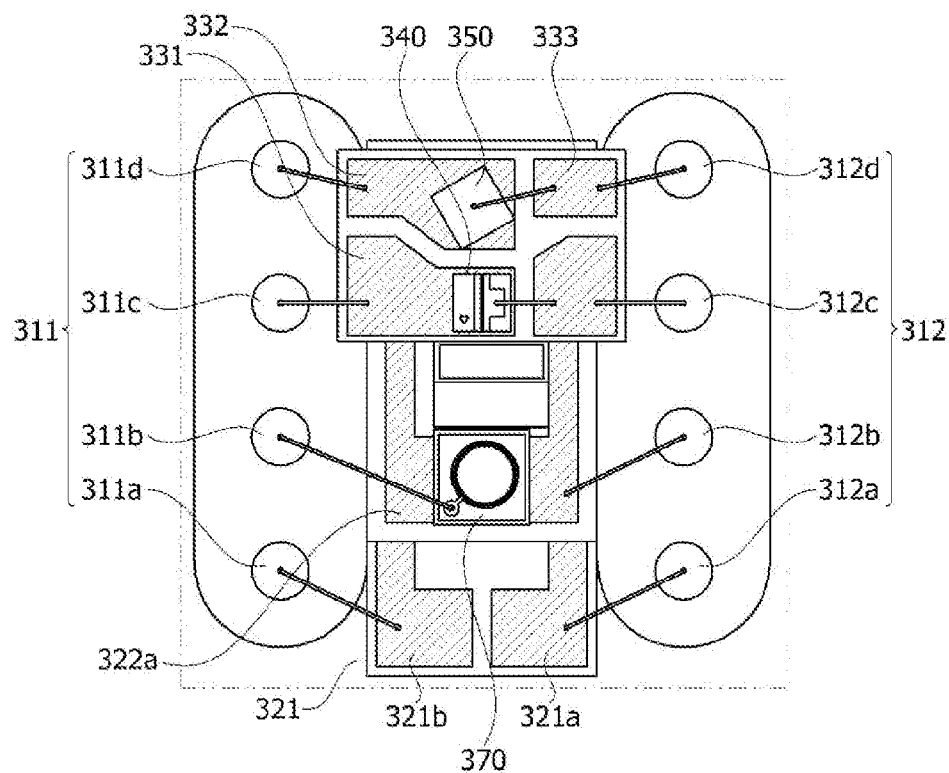

Then, referring to FIG. 8G electrode patterns 331, 332, 333, and 334 may be electrically connected to the corresponding lead electrodes 311 and 312 using wires W. Then, the housing (not shown) is attached to the support substrate 310 by welding or other means to protect optical components.

According to the example described above, each component may be sequentially assembled by die-bonding without being rotated from an initial arrangement of the components. Accordingly, productivity may improve, reducing unnecessary processes, and thus, a possibility of failure occurring in the process may be minimized.

Further, during a wire-bonding process, wire-bonding may be performed only by adjusting a height on the same plane without any rotation, thereby further increasing productivity during the manufacturing process.

Figure 9:
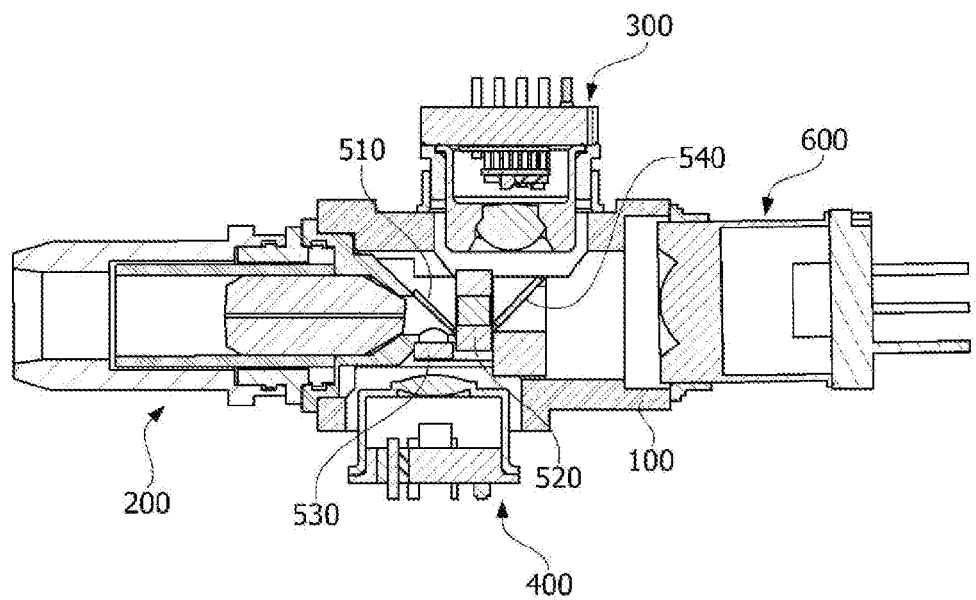
FIG. 9 is a view illustrating an example of an optical module according to an aspect of the present disclosure.

FIG. 9 is a view illustrating an optical module according to another aspect of the present disclosure.

Referring to FIG. 9, the optical module may include a case 100, a receptacle 200 inserted into the case 100, a first optical transmitter 300, a second optical transmitter 600, and an optical receiver 400. A light signal received from the outside through the receptacle 200 may be reflected by a first optical filter 510 and may be sent to the optical receiver 400.

A light signal output through the first optical transmitter 300 may be reflected by a first-second optical filter 540, may pass through the first optical filter 510, and may be output to the outside.

A light signal output through the second optical transmitter 600 may pass through the first-second optical filter 540 and the first optical filter 510 and may be output to the outside.

An isolator 520 may be disposed between the first optical filter 510 and the first-second optical filter 540 to block reflected noise. Such a type of the optical module may be called a triplexer type.

In the example shown here, the first optical transmitter 300 and/or the second optical transmitter 600 may include the above-described configuration of the optical transmitter itself. Further, the first optical transmitter 300 may be a distributed feedback (DFB) laser including a thermoelectric cooler (TEC) and may be a TO-Can type, and the second optical transmitter 600 maybe an electro-absorptive laser (EML) diode.

Further, in an aspect of the present disclosure, a monitoring photodiode (PD) may directly monitor an output of light used in communication. Accordingly, the output of light may be made stable.

Further, since a thermistor may be disposed close to a laser diode, wavelength stability based on a temperature change can be excellent.

Furthermore, an angle of a sloped surface of a prism can be adjusted according to a polishing angle of an optical fiber of a receptacle, and thus, reflection at a cross section of the optical fiber can be reduced. As a result, the light coupling efficiency can be improved.

Furthermore, die-bonding and wire-bonding for optical components can be eased.

The advantages and effects of the present disclosure may not be limited to the above, and they may be more easily understood by a skilled artisan in view of the detailed embodiments of the present disclosure.

In the present disclosure, particular combinations of features are disclosed in the specification and/or recited in the claims, but these combinations are not intended to limit the disclosure of the present technology. Further, the methods or methodologies for the present technology disclosed therein may be implemented in any sequence.

The term "unit" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combination thereof. The unit thus may include firmware, microcodes, circuits, data structures, tables, arrays and variables.

Further, while for the purpose of simplicity, the methods and/or methodologies are described herein as a series of steps or acts, the claimed subject matter is to be understood as being not limited by the order of the steps or acts. Some steps or acts may occur in different orders and/or concurrently with other acts from that shown and described herein. Further, not all illustrated steps or acts may be required to implement various methodologies described herein. Also, the methodologies disclosed herein and throughout the specification are capable of being stored on an article of manufacture to facilitate transporting and transferring such methodologies to one or more processing systems. The term "article of manufacture" is intended to encompass a computer program accessible from any computer-readable device, carrier, or medium.

In the present disclosure, a singular form may include a plural form if there is no clearly opposite meaning in the context. Also, as used therein, the article "a" is intended to include one or more items. Further, no element, act, step, or instruction used in the present disclosure should be construed as critical or essential to the present disclosure unless explicitly described as such in the present disclosure.

The terms "first," "second," and so forth used herein may also be used to describe various components, but the components are not limited by the above terms. The above terms are used only to discriminate one component from other components, without departing from the scope of the present disclosure. Also, the term "and/or" as used herein includes a combination of a plurality of items or any item of the plurality of the items. Further, when an element is described to be "coupled" or "connected" to another element, the element may be directly coupled or directly connected to the other element, or the element may be coupled or connected to the other element through a third element. Further, the term "include" or "have" as used herein indicates that a feature, an operation, a component, a step, a number, a part or any combination thereof described therein is present, and the above terms do not exclude a possibility of presence or addition of one or more other features, operations, components, steps, numbers, parts or combinations.

As noted herein, the present technology has been illustrated with specific examples described herein for the purpose of illustrations only, and thus one skilled in the art may appreciate that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical transmitter comprising:
a support substrate;
a temperature control module disposed on the support substrate;
a sub-mount disposed on the temperature control module;
a light receiving element disposed on the temperature control module;
a prism disposed on the temperature control module and having a sloped surface, the prism being disposed between the light receiving element and the sub-mount;
a light emitting element disposed on the sub-mount;
an optical fiber disposed on the sub-mount and in optical communication with the prism; and
a thermistor disposed on the sub-mount,
wherein:
the light receiving element is disposed separately from the sub-mount in a first direction and is disposed adjacent to the prism on the temperature control module,
a first portion of light emitted from the light emitting element is reflected by the sloped surface of the prism and emitted through a lens,
a second portion of the light passes through the prism and is received by the light receiving element in such a way that a light output from the light emitting element is directly monitored by the light receiving element, and
the sloped surface of the prism is angled such that a light coupling efficiency between the emitted light and the optical fiber is increased.

2. The optical transmitter of claim 1, wherein the temperature control module includes:
a first pad disposed on the support substrate;
a second pad disposed on the first pad; and
one or more thermoelectric semiconductors disposed between the first pad and the second pad.

3. The optical transmitter of claim 2, wherein the prism, the light receiving element, and the sub-mount are disposed on the second pad.

4. The optical transmitter of claim 2, wherein the second pad includes a conductive layer electrically coupled to the light receiving element.

5. The optical transmitter of claim 4, wherein the second pad includes an aligning groove formed on the conductive layer, and the prism is disposed in the aligning groove.

6. The optical transmitter of claim 1, wherein:
the light emitting element includes a first side which emits the light toward the prism and a second side which faces the first side; and
one surface of the thermistor is disposed to face the second side of the light emitting element.

7. The optical transmitter of claim 6, wherein an angle formed by the one surface of the thermistor and the second side of the light emitting element is in a range of 25 degrees to 45 degrees.

8. The optical transmitter of claim 1, wherein the light emitting element includes:
a first side which emits the light forward toward the prism;
a second side which faces the first side; and
a third side and a fourth side which connect the first side and the second side, wherein the thermistor is disposed adjacent to the third side.

9. The optical transmitter of claim 1, wherein:
a width of the sub-mount is greater than a width of the temperature control module; and
each of the width of the sub-mount and the width of the temperature control module is a length in a second direction perpendicular to the first direction.

10. The optical transmitter of claim 1, wherein a difference between a width of the sub-mount and a width of the temperature control module is in a range of about 0.2 mm to 0.4 mm.

11. The optical transmitter of claim 1, further comprising:
a plurality of first lead electrodes disposed along one side of the temperature control module; and
a plurality of second lead electrodes disposed along the other side of the temperature control module, wherein the one side and the other side of the temperature control module are sides parallel to the first direction.

12. The optical transmitter of claim 1, further comprising:
a housing disposed on the support substrate to protect optical components; and wherein the lens is disposed on the housing to collect the light reflected by the sloped surface.

13. The optical transmitter of claim 1, wherein an angle of the sloped surface of the prism is between about 41 degrees and about 49 degrees.

14. The optical transmitter of claim 1, wherein the sloped surface of the prism has an angle satisfying the following expression:

$$\theta_3 = 45° \pm \theta_1/2,$$

where $\theta_3$ denotes an angle of the sloped surface, and $\theta_1$ denotes a polishing angle of a cross section of an optical fiber of a receptacle.

\* \* \* \* \*